United States Patent
Ekas

(10) Patent No.: US 9,469,027 B2
(45) Date of Patent: Oct. 18, 2016

(54) TENDON BASED ROBOTIC FINGERS HAVING SHOCK ABSORBING AND SELF RE-ALIGNING FEATURES

(71) Applicant: Paul Ekas, Redwood City, CA (US)

(72) Inventor: Paul Ekas, Redwood City, CA (US)

(73) Assignee: Paul Ekas, Redwood City, CA (US)

( * ) Notice: Subject to any disclaimer, the term of this patent is extended or adjusted under 35 U.S.C. 154(b) by 0 days.

(21) Appl. No.: 14/833,798

(22) Filed: Aug. 24, 2015

(65) Prior Publication Data

US 2016/0052142 A1    Feb. 25, 2016

Related U.S. Application Data

(60) Provisional application No. 62/041,332, filed on Aug. 25, 2014, provisional application No. 62/087,664, filed on Dec. 4, 2014, provisional application No. 62/165,080, filed on May 21, 2015, provisional application No. 62/165,074, filed on May 21, 2015.

(51) Int. Cl.

| | |
|---|---|
| *B25J 15/00* | (2006.01) |
| *B25J 9/10* | (2006.01) |
| *B25J 15/08* | (2006.01) |
| *B25J 15/10* | (2006.01) |

(52) U.S. Cl.
CPC ........... *B25J 9/1045* (2013.01); *B25J 15/0009* (2013.01); *B25J 15/08* (2013.01); *B25J 15/10* (2013.01); *Y10S 901/21* (2013.01)

(58) Field of Classification Search
CPC ........ B25J 15/0009; B25J 15/08; B25J 9/04; B25J 9/1045; B25J 15/10; Y10S 901/21
USPC ......................................................... 294/111
See application file for complete search history.

(56) References Cited

U.S. PATENT DOCUMENTS

| | | | |
|---|---|---|---|
| 5,570,920 A | 11/1996 | Crisman et al. | |
| 8,083,278 B2 * | 12/2011 | Yuan | B25J 15/0009 294/106 |
| 8,833,827 B2 * | 9/2014 | Ciocarlie | B25J 15/08 294/106 |

(Continued)

FOREIGN PATENT DOCUMENTS

| | | |
|---|---|---|
| EP | WO 2009080373 | 7/2009 |
| JP | 2010110846 | 5/2010 |

(Continued)

OTHER PUBLICATIONS

Korean Intellectual Property Office, International Search Report issued in PCT/US2015/046596, Oct. 29, 2015, 3 pages.

(Continued)

*Primary Examiner* — Gabriela Puig
(74) *Attorney, Agent, or Firm* — Leech Tishman Fuscaldo & Lampl; Kenneth D'Alessandro, Esq.

(57) ABSTRACT

A robot mechanism includes a link formed from a first segment abutting a second segment at opposing faces thereof, at least one tendon passing from the first segment into the second segment, wherein the first segment is held in contact with the second segment by tension applied to the at least one segment.

17 Claims, 4 Drawing Sheets

(56) References Cited

U.S. PATENT DOCUMENTS

| | | | |
|---|---|---|---|
| 2005/0102037 | A1 | 5/2005 | Matsuda |
| 2005/0218679 | A1 | 10/2005 | Yokoyama et al. |
| 2006/0131908 | A1 | 6/2006 | Tadano |
| 2006/0142102 | A1 | 6/2006 | Radocaj |
| 2009/0018670 | A1 | 1/2009 | Puchhammer |
| 2010/0061835 | A1 | 3/2010 | Sim |
| 2011/0068595 | A1 | 3/2011 | Ihrke et al. |
| 2012/0186383 | A1 | 7/2012 | Schvalb et al. |
| 2014/0097631 | A1 | 4/2014 | Ciocarlie et al. |
| 2016/0052129 | A1* | 2/2016 | Ekas ............... B25J 9/1045 74/490.04 |

FOREIGN PATENT DOCUMENTS

| | | |
|---|---|---|
| JP | 2010110846 | 5/2015 |
| JP | 2005351476 | 12/2015 |
| KR | 101117253 | 3/2012 |
| KR | 101186806 | 9/2012 |
| WO | 8404722 | 6/1984 |
| WO | 03/013783 | 2/2003 |
| WO | 2009/080373 | 7/2009 |

OTHER PUBLICATIONS

Korean Intellectual Property Office, Written Opinion issued in PCT/US2015/046596, Oct. 29, 2015, 12 pages.
Korean Intellectual Property Office, International Search Report issued in PCT/US2015/046599, Nov. 3, 2015, 3 pages.
Korean Intellectual Property Office, Written Opinion issued in PCT/US2015/046599, Nov. 3, 2015, 10 pages.
Korean Intellectual Property Office, International Search Report issued in PCT/US2015/046603, Oct. 22, 2015, 3 pages.
Korean Intellectual Property Office, Written Opinion issued in PCT/US2015/046603, Oct. 22, 2015, 9 pages.
Korean Intellectual Property Office, International Search Report issued in PCT/US2015/046606, Nov. 3, 2015, 3 pages.
Korean Intellectual Property Office, Written Opinion issued in PCT/US2015/046606, Nov. 3, 2015, 8 pages.
Korean Intellectual Property Office, International Search Report issued in PCT/US2015/046780, Nov. 3, 2015, 3 pages.
Korean Intellectual Property Office, Written Opinion issued in PCT/US2015/046780, Nov. 3, 2015, 17 pages.

* cited by examiner

TENDON BASED ROBOTIC FINGERS HAVING SHOCK ABSORBING AND SELF RE-ALIGNING FEATURES

CROSS-REFERENCE TO RELATED APPLICATIONS

This application claims the benefit of U.S. Provisional Patent Application No. 62/041,332 for "Cable Guide System for Robotic Mechanical Manipulator Structure," filed Aug. 25, 2014; Provisional Patent Application No. 62/087,664 for "Tendon Configuration for Under-Actuated Robotic Manipulator With Progressive Wrapping Links," filed Dec. 4, 2014; Provisional Patent Application No. 62/165,080 for "Tendon Configuration for Under-Actuated Robotic Manipulator With Progressive Wrapping Links," filed May 21, 2015; and Provisional Patent Application No. 62/165,074 for "Apparatus and Method for Attaching Apparatus to Robotic Fingers," filed May 21, 2015 the contents of all of which are incorporated in this disclosure by reference in their entirety.

BACKGROUND

1. Field of the invention

The invention relates in general to robot mechanisms including serial link structures utilizing revolute joints, such as mechanical manipulators, robotic grippers and appendages for use in robotics applications.

2. The Prior Art

Robot mechanisms including serial link structures utilizing revolute joints include robotic grippers that are generally connected at the end of robotic arms. Robotic grippers that are constructed with links and joints that act similarly to fingers are susceptible to damage. It is easy to accidently break the fingers of robotic grippers if the robot knocks the fingers against hard surfaces. This is particularly likely where robots are used in unstructured environments where the feedback systems and dynamic control of the robot may not be able to prevent such accidents.

Potential solutions include making robotic grippers and fingers very strong or very flexible. Both solutions have been implemented. Increased strength usually results in increased weight and cost, both of which negatively affect the performance and market viability of the robotic grippers. Another alternative is increasing the flexibility of the fingers, but that trades off stiffness for flexibility, which can have negative performance impacts in the functionality of the robotic gripper.

Robotic grippers can be separated into two classes, intrinsic and extrinsic robotic grippers. Intrinsic robotic grippers have the motors in or close to the joints they are controlling. Extrinsic robotic grippers usually use some type of tendon or cable between the joints they are controlling and an actuator that is located away from the joints.

A solution for protecting fingers from damage has been developed using magnets to hold the finger to the palm of the robotic gripper, but "break-away" from the palm if the fingers are strongly impacted. This solution does a good job of protecting the finger from damage while maintaining good finger structural properties. However, this solution has both the finger and motor on the "break-away" portion of the finger, which is more similar to an intrinsic finger design.

A weakness of this design is that the power that can be applied through the finger is limited by the strength of the magnetic connection between the finger and the robotic gripper. Thus a very powerful finger requires a very strong magnetic connection to the palm of the robotic gripper. The stronger the magnetic field in the palm of the robotic gripper, the stronger the magnetic interaction with the operational environment of the robot, which can have negative consequences in attracting ferromagnetic components or particles or interfering with magnetically sensitive equipment.

Another weakness of the existing approach to magnetic finger attachment is that if the finger is knocked off the palm of the robotic gripper, the finger is no longer attached to the robot and cannot be easily reattached without human intervention or a very intelligent robot. For example, if a robot is operating at a contaminated disaster site where humans cannot operate and the finger is knocked off, there is significant overhead to retrieve the finger and replace it onto the palm.

In the existing magnetic attachment of fingers, the force of the load on the finger is wholly supported by the magnets. Since there are two types of forces acting on the finger, desired load and undesired load (unintentional impact), the fingers are far more likely to fall off while under desired load. When the fingers are not under load, they have a very strong force keeping them attached to the robotic gripper. This limits their protection when they most need it.

Finally, the prior art for magnetic attachment of fingers in robotic grippers does not apply to extrinsic architectures that use tendons for transmitting power to joints.

SUMMARY

According to a first aspect of the invention, a robot mechanism including a serial link structure utilizing revolute joints is composed of at least two sequential pieces held together solely by the compressive force of tension on tendons spanning the interface of the link pieces. When a force impacts the robot mechanism link structure, the link composed of sequential pieces can pull apart such that the rest of the structure does not break. When the two pieces are realigned, either manually or automatically, the alignment of the two link pieces will be re-aligned with the path of the tendons passing between the two link pieces. The result is that no damage is done to the link structure (i.e., the finger pulls apart but does not break).

According to a second aspect of the invention, a shaped socket is used between the two sequential pieces of the link in addition to the tendons. When the tendons are under tension, the two pieces of the link are held together and aligned by the tendons. The complimentary fit of the two pieces in the socket provides another aligning mechanism.

The shape of the socket connection should provide alignment of the two link pieces, but should not constrain the angular relationship of the two link pieces in a way that could prevent the two link pieces from pulling apart under damaging load.

According to a third aspect of the invention, a link in a tendon based structure is composed of at least two sequential pieces with a magnetic pair providing an attracting force between the two link pieces. In addition, tendons span the interface between the link pieces to provide another force holding the link pieces together. The structure of the link pieces should be held firmly using only the tendons when under tension. The structure of the link pieces should be held together using only the magnetic force between the link pieces.

The magnetic pair can be composed of two magnets, a magnet and a piece of metallic material such as iron, or any combination magnets and magnetic material that provides magnetic attraction between the pairs.

According to a fourth aspect of the invention, two link pieces can combine tendons, sockets and magnetic pairs to provide forces that hold the links together and a socket that aligns the two pieces.

According to a fifth aspect of the invention, a combination of magnetic pairs can improve the automatic alignment of the two link pieces. This can be accomplished using three or more magnets to provide alignment based on the polarity of the magnets. An example implementation uses four magnets in two pairs. Two magnets are in the first half of the link and two magnets are in the second half of the link. The magnets are setup so the magnets in the first half of the link align with the magnets in the second half of the link. However, the two pairs of attracting magnets are setup with opposite polarities so they can only attach in one direction. This increases the robustness of a link when it is knocked out of the socket and automatically reconnects by making sure the link is aligned correctly.

According to a sixth aspect of the invention, the link pieces are located close to a joint between a robotic finger and a palm of a robotic gripper.

According to a seventh aspect of the invention, any combination of magnets and magnetic metal can be placed in the finger and palm that in combination achieve a magnetic attraction. The magnet could be in the base of the finger or in the palm or both. The complementary metal can be either in the base of the finger or the palm. Or a magnet can be used in both locations.

According to an eighth aspect of the invention, The strength of the magnetic connection between the link pieces needs to be strong enough to hold the link in place under load, but weaker than the force necessary to break or damage a link. Therefore, the connection force is able to be stronger for a strong link and should be weaker for a lower strength link.

BRIEF DESCRIPTION OF THE DRAWING FIGURES

DETAILED DESCRIPTION

Persons of ordinary skill in the art will realize that the following description of the present invention is illustrative only and not in any way limiting. Other embodiments of the invention will readily suggest themselves to such skilled persons.

The examples presented in this disclosure are described in the illustrative environment comprising a link in a mechanism such as a tendon based robotic gripper that is formed from at least two sequential pieces held together solely by the compressive force of tension on tendons spanning the interface of the link pieces. Persons of ordinary skill in the art will readily appreciate that the principles of the present invention disclosed herein pertain more generally to robot mechanisms including a serial link structure utilizing revolute joints, and that the scope of the present invention is intended to encompass all such robot mechanisms that include a serial link structure utilizing revolute joints.

Figure 1A:
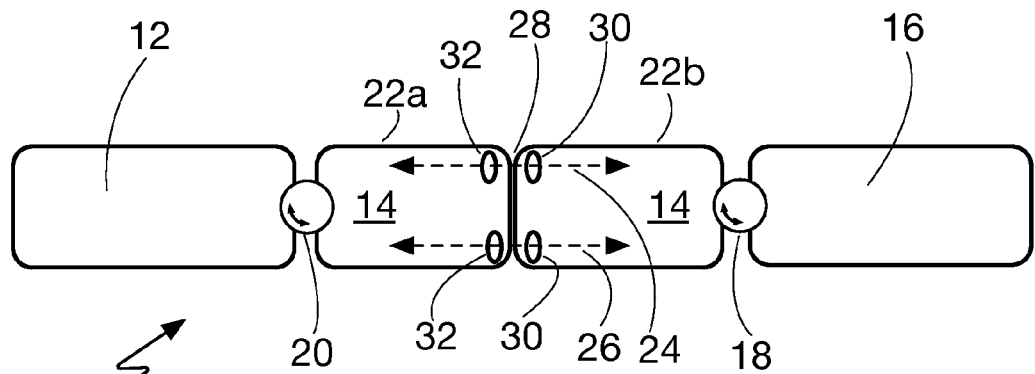
FIG. 1A is a diagram showing a set of links and joints in accordance with the present invention actuated by tendons where the center link includes two pieces held together by the tension in the tendons.

Referring first to FIG. 1A, a diagram shows an illustrative link assembly 10 in accordance with the principles of the present invention. The link assembly 10 depicted in FIG. 1 shows three sequential links 12, 14, and 16 coupled to one another by two joints 18 and 20. The center link 14 is formed from two separate segments 22a and 22b that are pulled together by tension applied to tendons 24 and 26 that pass through the links 12, and 16, and through the two pieces 22a and 22b that form center link 14. The tension on the tendons 24 and 26 pulls the two segments 22a and 22b of the center link 14 together at their interface 28 forming a rigid link. The tendons 24 and 26 are separated from one another and pass through different cable guides 30 and 32 that also provide an alignment force between the two segments 22a and 22b of the center link 14. Because the tendons 24 and 26 in this embodiment are routed through different spaced-apart cable guides, segments 22a and 22b are not rotatable with respect to one another about an axis perpendicular to the tendons 24 and 26. Cable guides 30 and 32 provide both a way to route the tendons 24 and 26 through the links 12, 14, and 16 and also provide an alignment mechanism for the two segments 22a and 22b that comprise center link 14.

Figure 1B:
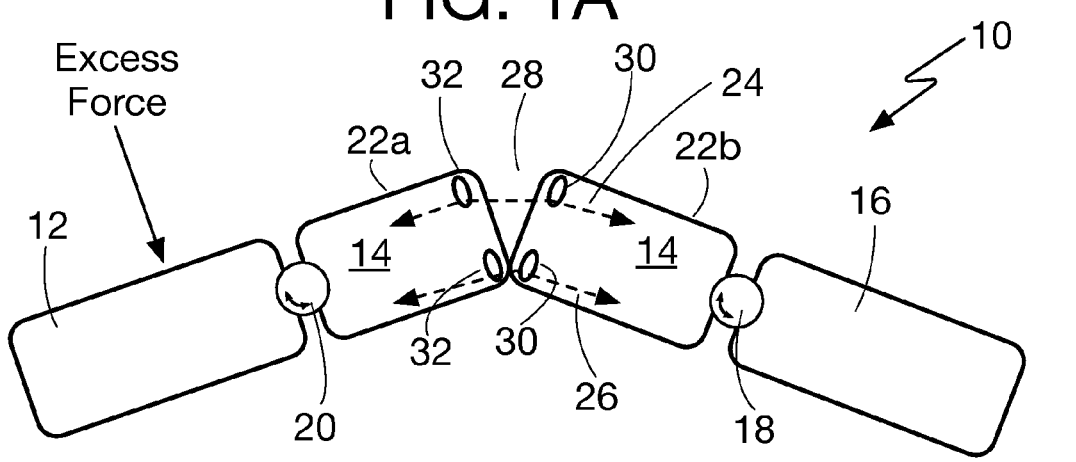
FIG. 1B is a diagram showing the set of links and joints of FIG. 1 breaking away from one another while a predetermined torque or force beyond the normal range of motion for the links or a predetermined force pulling on the links is applied.

Referring now to FIG. 1B, a diagram shows the set of links and joints of FIG. 1 breaking away from one another while a predetermined torque or force beyond the normal range of motion in one or more directions for the links or a predetermined force pulling on the links is applied. As shown in FIG. 1B, the arrangement of FIG. 1A allows the two segments 22a and 22b to break away from one another when too much torque or force is applied in one or more directions to the set of links 12, 14, and 16. When the excess force is removed from the set of links, the two segments 22a and 22b are pulled back together and re-aligned by the tension on the tendons 24 and 26. The protection afforded by this embodiment is limited by the strength of the tendons 24 and 26.

Figure 2:
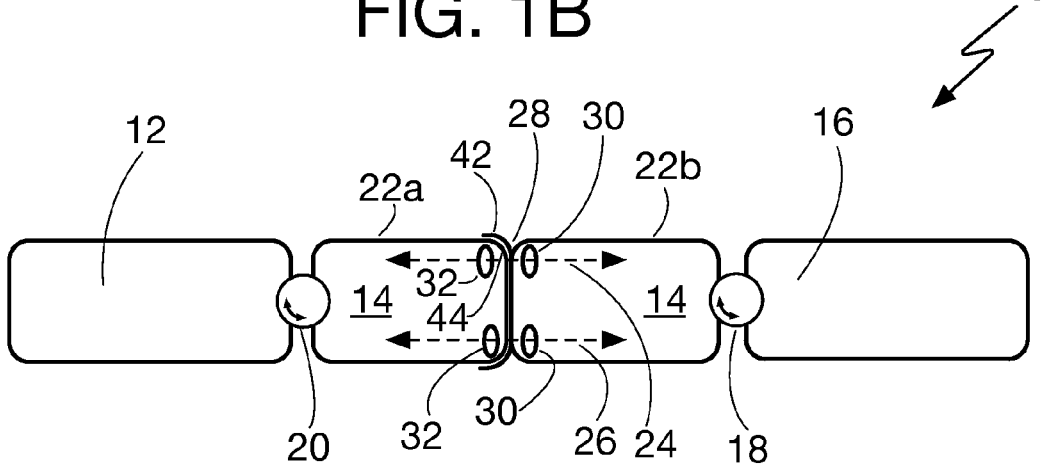
FIG. 2 is a diagram showing a set of links and joints in accordance with the present invention in which the center link includes two segments held together by the tension in the tendons and a socket interface between the two segments.

Referring now to FIG. 2, a diagram shows another illustrative link assembly 40 in accordance with the principles of the present invention in which the center link includes two segments held together by the tension in the tendons and a socket interface between the two segments. Elements of FIG. 2 that are common to the assembly of FIG. 1 are referred to using the same reference numerals used in FIG. 1.

In the embodiment of FIG. 2, three sequential links 12, 14, and 16 are coupled together by two joints 18 and 20. The center link 14 is composed of two separate segments 22*a* and 22*b* that are pressed together by the tension applied to tendons 24 and 26. As in the embodiment of FIG. 1, the tendons 24 and 26 are separated from one another and pass through different cable guides 30 and 32 that also provide an alignment force between the two segments 22*a* and 22*b* of the center link 14. Cable guides 30 and 32 provide both a way to route the tendons 24 and 26 through the links 12, 14, and 16 and also provide an alignment mechanism for the two segments 22*a* and 22*b* that comprise center link 14.

The interface 28 between the two segments of the center link 14 includes mating shaped portions 42 and 44 on the opposing faces of the two segments 22*a* and 22*b* to provide alignment forces on the two segments 22*a* and 22*b* of the center link 14 when under compressive tension. The shapes of the mating shaped portions 42 and 44 are shown diagrammatically as the face and edges of the leftmost segment 22*a* engaged by an enclosing portion extending from the rightmost segment 22*b* such that the segments 22*a* and 22*b* are aligned and can be as simple as a partial ball and socket. A more complex socket, such as a V groove, could be used to provide increased directional alignment of the link 14. Persons of ordinary skill in the art will appreciate that the depth of the mating shaped portions 42 and 44 should be selected so as to allow the two segments 22*a* and 22*b* to break away from one another when a predetermined amount of excess force is applied to the set of links 12, 14, and 16. When the excess force is removed from the set of links 12, 14, and 16, the two segments 22*a* and 22*b* are pulled back together and re-aligned by the tension on the tendons 24 and 26 and by the mating shaped portions 42 and 44. The protection afforded by this embodiment is limited by the strength of the tendons 24 and 26.

Figure 3:
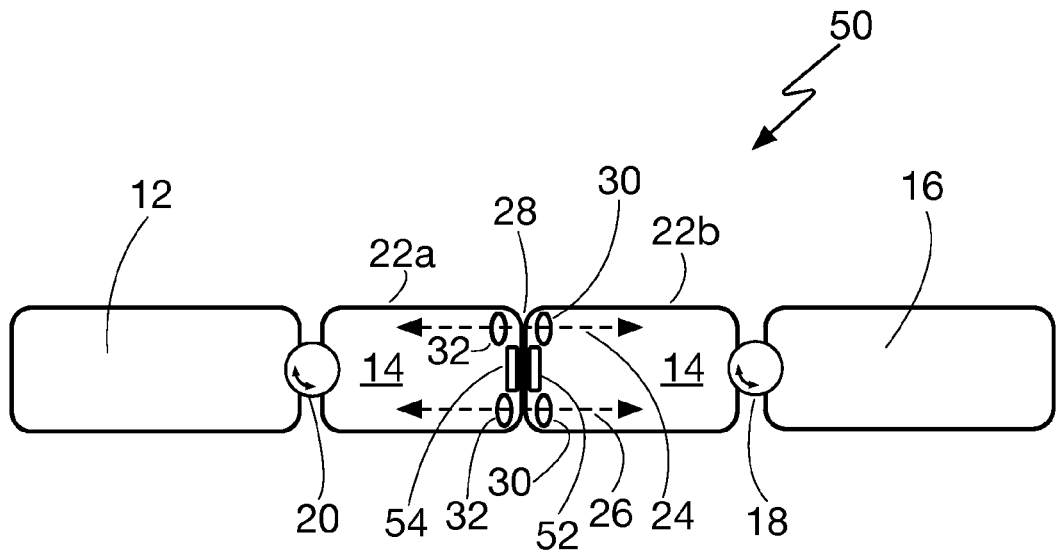
FIG. 3 is a diagram showing a set of links and joints in accordance with the present invention in which the center link includes two segments held together by the tension in the tendons and a magnetic pair between the two segments.

Referring now to FIG. 3, a diagram shows another illustrative link assembly 50 in accordance with the principles of the present invention in which the center link includes two segments held together by the tension in the tendons and a magnetic pair between the two pieces. Elements of FIG. 3 that are common to the assembly of FIG. 1 are referred to using the same reference numerals used in FIG. 1.

FIG. 3 shows three sequential links 12, 14, and 16 coupled together by two joints 18 and 20. The center link 14 is formed from two separate segments 22*a* and 22*b* that are pressed together. A magnetic pair 52 and 54 is provided at the interface 28 between the two segments 22*a* and 22*b* of the center link 2. The magnetic pair 52 and 54 can comprise two magnets, a magnet and a magnetic material, or a combination of multiple magnets and or magnetic material.

One half of the magnetic pair 52 is provided on the leftmost segment 22*a* and the other half 54 of the magnetic pair is provided on the rightmost segment 22*b*. The magnetic pair 52 and 54 together provide a magnetic attracting force between the two segments 22*a* and 22*b* of the center link 14. Persons of ordinary skill in the art will appreciate that the strength of the magnetic force between the two halves of the magnetic pair 52 and 54 should be selected so as to allow the two segments 22*a* and 22*b* to break away from one another when a predetermined amount of excess force is applied to the set of links 12, 14, and 16. When the excess force is removed from the set of links 12, 14, and 16, the two segments 22*a* and 22*b* are pulled back together and re-aligned by the magnetic force between the two halves of the magnetic pair 52 and 54 and the tension on the tendons 24 and 26. The protection afforded by this embodiment is limited by the strength of the tendons 24 and 26.

Figure 4:
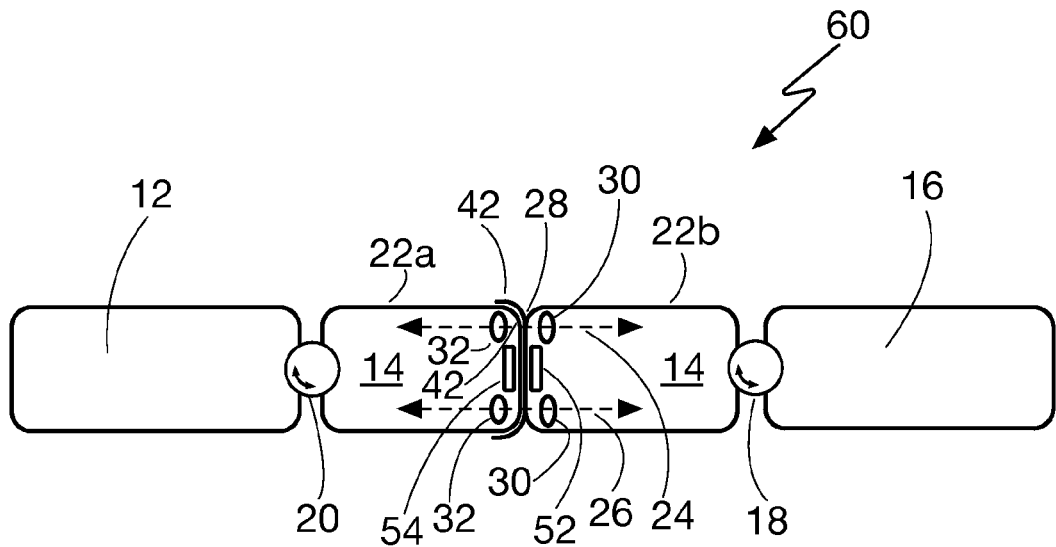
FIG. 4 is a diagram showing a set of links and joints in accordance with the present invention in which the center link includes two segments held together by the tension in the tendons, a magnetic pair between the two segments and aligned by a socket interface between the two pieces.

Referring now to FIG. 4, a diagram shows another illustrative link assembly 60 in accordance with the principles of the present invention in which the center link includes two segments held together by the tension in the tendons, and a magnetic pair between the two segments and aligned by mating shaped portions, such as a socket interface between the two segments on the opposing faces of the two segments. Elements of FIG. 4 that are common to the assembly of FIG. 1 through FIG. 3 are referred to using the same reference numerals used in FIG. 1.

FIG. 4 shows three sequential links 12, 14, and 16 coupled together by two joints 18 and 20. The center link 14 is formed from two separate segments 22*a* and 22*b* that are pressed together. The interface 28 between the two segments 22*a* and 22*b* of the center link 14 includes a magnetic link between magnet pair 52 and 54, a mating socket arrangement formed by mating shaped portions 42 of the two segments 22*a* and 22*b*. Tendons 24 and 26 span the interface 28 between the two segments 22*a* and 22*b* of the center link 14. Persons of ordinary skill in the art will appreciate that the strength of the magnetic force between magnet pair 52 and 54 and the shape of the socket arrangement between mating shaped portions 42 of the two segments 22*a* and 22*b* should be selected so as to allow the two segments 22*a* and 22*b* to break away from one another when a predetermined amount of excess force is applied to the set of links 12, 14, and 16. When the excess force is removed from the set of links 12, 14, and 16, the two segments 22*a* and 22*b* are pulled back together and re-aligned by the magnetic force between the two halves of the magnetic pair 52 and 54, the shaped socket arrangement at the interface of the two segments 22*a* and 22*b* and the tension on the tendons 24 and 26. The protection afforded by this embodiment is limited by the strength of the tendons 24 and 26.

Figure 5:
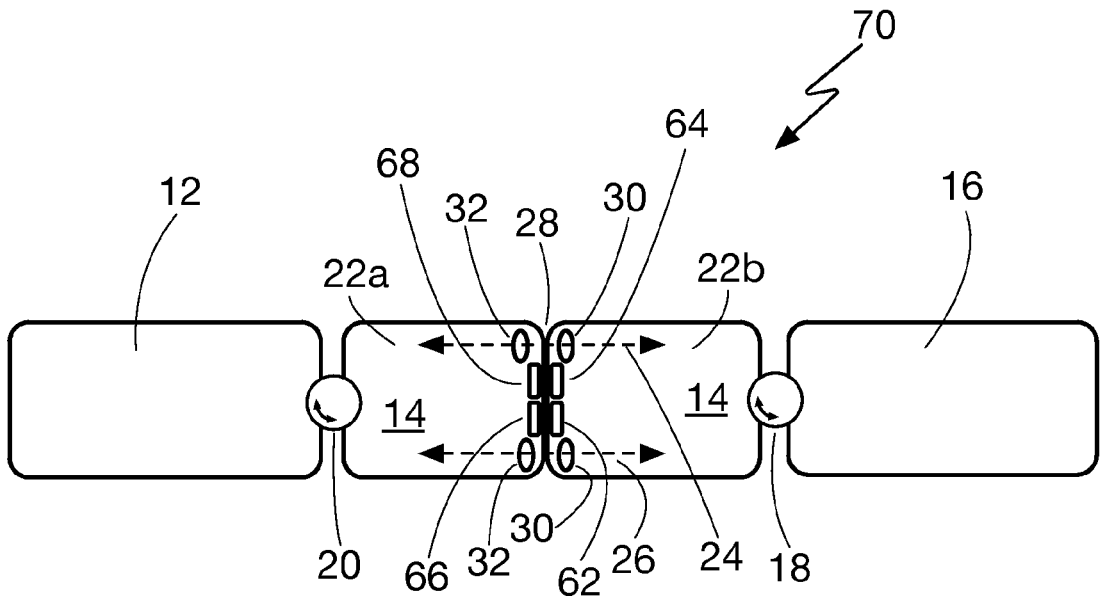
FIG. 5 is a diagram showing a set of links and joints in accordance with the present invention in which the center link includes two segments held together by the tension in the tendons and two magnetic pairs between the two segments which have opposite polar orientations to force a specific alignment between the two pieces.

Referring now to FIG. 5, a diagram shows another illustrative link assembly 70 in accordance with the principles of the present invention in which the center link includes two segments held together by the tension in the tendons and two magnetic pairs between the two segments which have opposite polar orientations to force a specific alignment between the two segments.

FIG. 5 shows three sequential links 12, 14, and 16 coupled together by two joints 18 and 20. The center link 14 is formed from two separate segments 22*a* and 22*b* that are pressed together by the tension on tendons 24 and 26. The interface 28 between the two segments 22*a* and 22*b* of the center link 14 includes a magnetic link 15 that provides improved alignment between the two link segments 22*a* and 22*b*.

Magnets 62 and 64 are attached to segment 22*a* at one side of the center link 14 and magnets 66 and 68 are attached to segment 22*b* on the other side of the center link 14. In the configuration shown in FIG. 5, the orientation of the poles of the opposed pair of magnets 62 and 66, is opposite to the orientation of the poles of the opposed pair of magnets 64 and 68, to provide a magnetically keyed alignment. Magnetic attraction between the magnets in segments 22*a* and 22*b* of link 14 will only occur when segments 22*a* and 22*b* are aligned relative to one another such that magnets 62 and 66 are aligned opposite one another and magnets 64 and 68 are aligned opposite one another.

Persons of ordinary skill in the art will appreciate that the strength of the magnetic force between the two magnetic pairs 62 and 66 and 64 an 68 should be selected so as to allow the two segments 22*a* and 22*b* to break away from one another when a predetermined amount of excess force is applied to the set of links 12, 14, and 16. When the excess force is removed from the set of links 12, 14, and 16, the two segments 22*a* and 22*b* are pulled back together and re-aligned by the magnetic attraction forces between the two magnetic pairs 62 and 66 and 64 and 68 and the tension on the tendons 24 and 26. The protection afforded by this embodiment is limited by the strength of the tendons 24 and 26.

Figure 6:
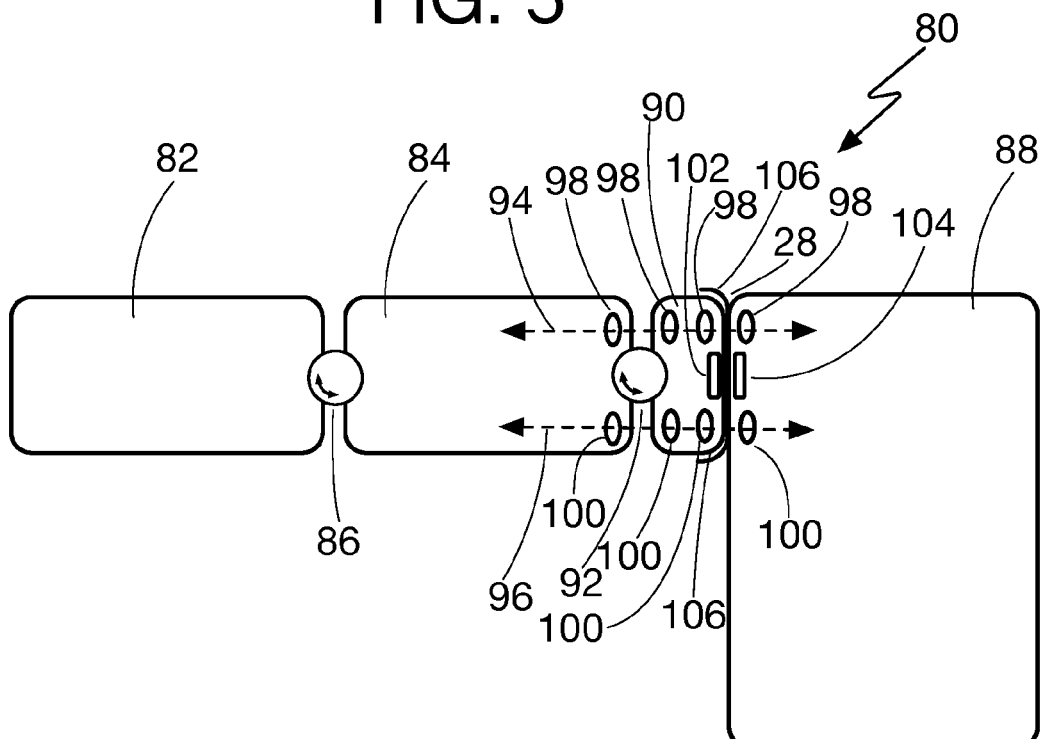
FIG. 6 is a diagram showing a robotic gripper illustrating only one finger with a link between the palm of the robotic gripper in accordance with the present invention in which the link interface between the palm and the fingers includes tendons, sockets and magnets that hold the finger to the palm.

Referring now to FIG. 6, a diagram shows a robotic gripper 80 including a link assembly having links 82 and 84 coupled by a joint 86. Link 84 is joined to robotic gripper base 88 using a link segment 90. Link segment 90 is coupled to link 84 by a joint 92. Link segment 90 is joined to robot gripper base using a combination of the techniques disclosed herein.

In the illustrative embodiment shown in FIG. 6, the interface between the link segment 90 and the robotic gripper base 88 includes a combination of the techniques disclosed herein. Tendons 94 and 96 pass between link 82 and robotic gripper base 88 through link segment 90. Tendon 94 passes through cable guides 98 in link 84, link segment 90 and robotic gripper base 88. Tendon 96 passes through cable guides 100 in link 84, link segment 90 and robotic gripper base 88.

In addition, magnetic pair 102 and 104, located in link segment 90 and robotic gripper base 88, respectively, operate as already disclosed herein with reference to FIGS. 3 and 4.

Finally, a mating socket arrangement formed by mating shaped portions 106 at the interface of robot gripper base 88 and link segment 90 cooperate to realign the link assembly including links 82 and 84 after they have been displaced from robot gripper base 88 due to application of excess force to the links.

As will be appreciated by persons of ordinary skill in the art, the tendons, socket arrangement, and magnetic coupling operate in the same manner as disclosed with reference to the embodiments shown in FIGS. 1-5 herein and cooperate to provide recoverable break away operation.

While only one finger is shown in FIG. 6 for purposes of illustrating the invention, persons of ordinary skill in the art will appreciate that a robotic gripper in accordance with the principles of the present invention will normally be equipped with multiple fingers. It is preferred that each finger be equipped with one or more features of the present invention to provide protection against application of excess force.

Figure 7:
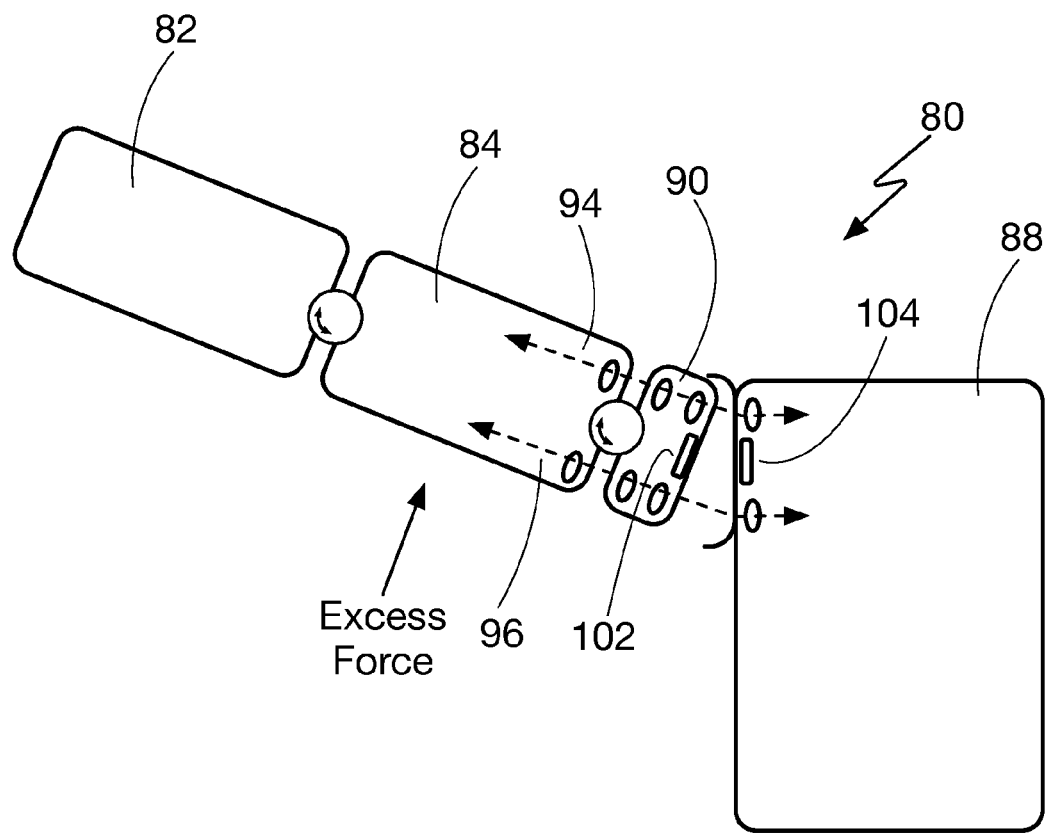
FIG. 7 is a diagram showing the robotic gripper of FIG. 6 in a condition where the finger is separated from the palm at the interface between the two pieces of link by application of excess force.

FIG. 7 shows the robotic gripper 80 with a finger including links 82 and 84 pulled away from the robotic gripper base 88 in response to application of excess force in the direction of the solid arrow. In accordance with the present invention, as the excess force is removed, the tendons 94 and 96 and the attractive force between the members 102 and 104 of the magnetic pair provide a force that brings the finger back to the palm and the socket also provides alignment between the finger and the palm One benefit of this invention over prior art arrangements using only magnets is that when used on a robotic gripper, the finger does not fall away from the robotic gripper in response to application of excess force, but remains at least hanging by the tendons and do not incur structural damage. The finger will not get lost as it can when prior art arrangements are employed.

Another benefit provided by the present invention is that when the tendons are pulled tight by the actuators, they will tend to pull the finger back into its normal position. This means that when the finger breaks away, it is possible for it to be quickly brought back into correct alignment for continued uninterrupted operation. The present invention thus provides a major benefit over previous implementations of magnetic based connections of fingers in robotic grippers.

In robot operation the likelihood of the fingers being broken is far higher when not grasping an object versus when they are grasping an object. One simple explanation for this is that when the fingers are extended and not grasping an object they are more exposed than when wrapped around an object.

In the prior art, the magnet that holds the finger to the palm must be as strong or stronger than the maximum force exerted through the finger to grasp objects such that the finger does not fall off.

In the embodiments of the invention that employ magnets, when the robotic gripper is not grasping an object, the primary force maintaining finger attachment to the palm is the magnet and/or lower tension in the tendons. Under these conditions, the finger is most susceptible to breakage and therefore having a weaker attachment of the finger to the palm provides easier breakaway functionality thus providing improved protection for the robotic finger.

With the present invention, when the robotic gripper grasps an object, the primary force holding the fingers to the palm is the pull on the tendons. The load from the object being carried, for example a heavy piece of luggage, is carried primarily through the tendons and not the magnets. Thus, under load the fingers are not likely to get dislodged.

The concepts of the present invention can be scaled up and be utilized in larger implementations for robot mechanisms including serial link structures utilizing revolute joints that utilize tendons to transmit force.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A robot mechanism comprising:
   a link formed from a first segment abutting a second segment at opposing faces thereof;
   at least one tendon passing from the first segment into the second segment, at least one end of the at least one tendon having no connection to either one of the first and second segments;
   wherein the first segment is held in contact with the second segment by tension applied to the at least one tendon.

2. The robot mechanism of claim 1 wherein the at least one tendon is operated under a tension selected to allow at least partial separation between the first and second segments from one another when a predetermined torque or force beyond the normal range of motion for the links in at least one direction or a predetermined force pulling on the links is applied.

3. The robot mechanism of claim 1 further including mating shaped portions on the opposing faces of the first and second segments configured so as to allow the first and second segments to break away from one another when a predetermined torque or force beyond the normal range of motion for the links in at least one direction or a predetermined torque or force pulling on the links is applied and to re-align the first and second segments with one another when the predetermined torque or force is removed from the link and the first and second segments are pulled back together by the tension on the at least one tendon.

4. The robot mechanism of claim 1 wherein the at least one tendon comprises:
   a first tendon passing from the first segment into the second segment;
   a second tendon passing from the first segment into the second segment at a position spaced apart from a position where the first tendon passes from the first segment to the second segment.

5. The robot mechanism of claim 4 further including mating shaped portions on the opposing faces of the first and second segments configured so as to allow the first and second segments to break away from one another when a predetermined torque or force beyond the normal range of motion for the links in at least one direction or a predetermined torque or force pulling on the links is applied to the link and to re-align the first and second segments with one another when the predetermined torque or force is removed from the link and the first and second segments are pulled back together by the tension on the first and second tendons.

6. A robot mechanism comprising:
   a link formed from a first segment abutting a second segment at opposing faces thereof;
   at least one tendon passing from the first segment into the second segment, at least one end of the at least one tendon having no connection to either one of the first and second segments; and
   a two-piece magnetic pair, one piece of the magnetic pair magnetically coupled to each face of the opposing faces.

7. The robot mechanism of claim 6 wherein:
   the at least one tendon is operated under a tension selected to allow at least partial separation between the first and second segments from one another when a first predetermined torque or force beyond the normal range of motion for the links in at least one direction or a predetermined torque or force pulling on the links is applied to the at least one link; and
   the magnetic attractive force between the two pieces of the magnetic pair is selected to allow at least partial separation between the first and second segments from one another when a second predetermined torque or force beyond the normal range of motion for the links in at least one direction or a predetermined torque or force pulling on the links is applied to the at least one link.

8. The robot mechanism of claim 6 wherein one piece of the magnetic pair is a magnet and the other piece of the magnetic pair is a ferromagnetic material.

9. The robot mechanism of claim 6 wherein both pieces of the magnetic pair are magnets.

10. The robot mechanism of claim 6 further including mating shaped portions on the opposing faces of the first and second segments configured so as to allow the first and second segments to break away from one another when a predetermined torque or force beyond the normal range of motion for the links in at least one direction or a predetermined torque or force pulling on the links is applied to the link and to re-align the first and second segments with one another when the predetermined torque or force is removed from the link and the first and second segments are pulled back together by the tension on the at least one tendon and the magnetic force between the two pieces of the magnetic pair.

11. The robot mechanism of claim 6 wherein the at least one tendon comprises:
   a first tendon passing from the first segment into the second segment;
   a second tendon passing from the first segment into the second segment at a position spaced away from a position where the first tendon passes from the first segment to the second segment.

12. The robot mechanism of claim 11 further including mating shaped portions on the opposing faces of the first and second segments configured so as to allow the first and second segments to break away from one another when a predetermined torque or force beyond the normal range of motion for the links in at least one direction or a predetermined torque or force pulling on the links is applied to the link and to re-align the first and second segments with one another when the predetermined torque or force is removed from the link and the first and second segments are pulled back together by the tension on the first and second tendons and the magnetic force between the two pieces of the magnetic pair.

13. A robot mechanism comprising:
   a link formed from a first segment abutting a second segment at opposing faces thereof;
   at least one tendon passing from the first segment into the second segment, at least one end of the at least one tendon having no connection to either one of the first and second segments;
   a first pair of magnets including a first magnet and a second magnet, the first magnet magnetically coupled to one of the opposing faces, and the second magnet magnetically coupled to the other one of the opposing faces, magnetic poles of the first pair of magnets oriented to provide a magnetic attractive force between the first and second magnet; and
   a second pair of magnets including a third magnet and a fourth magnet, the third magnet magnetically coupled to one of the opposing faces, and the fourth magnet magnetically coupled to the other one of the opposing faces, magnetic poles of the second pair of magnets oriented to provide a magnetic attractive force between the third and fourth magnet; the magnetic poles of the first pair of magnets aligned opposite to the magnetic poles of the second pair of magnets.

14. The robot mechanism of claim 13 wherein the at least one tendon comprises:
   a first tendon passing from the first segment into the second segment;
   a second tendon passing from the first segment into the second segment at a position spaced away from a position where the first tendon passes from the first segment to the second segment.

15. The robot mechanism of claim 14 further including mating shaped portions on the opposing faces of the first and second segments configured so as to allow the first and second segments to break away from one another when a predetermined torque or force beyond the normal range of motion for the links or a predetermined torque or force pulling on the links is applied to the link and to re-align the first and second segments with one another when the predetermined torque or force is removed from the link and the first and second segments are pulled back together by the tension on the first and second tendons and the magnetic force between the first and second pairs of magnets.

16. The robot mechanism of claim 13 further including mating shaped portions on the opposing faces of the first and second segments configured so as to allow the first and second segments to break away from one another when a predetermined torque or force beyond the normal range of motion for the links or a predetermined torque or force pulling on the links is applied to the link and to re-align the first and second segments with one another when the predetermined torque or force is removed from the link and the first and second segments are pulled back together by the tension on the at least one tendon and the magnetic force between the first and second pairs of magnets.

17. A robot mechanism comprising:
a link formed from a first segment abutting a second segment at opposing faces thereof;
at least one tendon passing from the first segment into the second segment, at least one end of the at least one tendon passing through both the first segment and the second segment and having no connection to either one of the first and second segments;
wherein the first segment is held in contact with the second segment by tension applied to the at least one tendon.

* * * * *